(12) United States Patent
Matsui

(10) Patent No.: US 7,184,020 B2
(45) Date of Patent: Feb. 27, 2007

(54) OPERATION INSTRUCTING DEVICE, OPERATION INSTRUCTING METHOD, AND OPERATION INSTRUCTING PROGRAM

(75) Inventor: Gantetsu Matsui, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 535 days.

(21) Appl. No.: 10/684,538

(22) Filed: Oct. 14, 2003

(65) Prior Publication Data

US 2004/0130524 A1 Jul. 8, 2004

(30) Foreign Application Priority Data

Oct. 30, 2002 (JP) ............... 2002-315701

(51) Int. Cl.
G09G 5/00 (2006.01)
G11B 27/00 (2006.01)

(52) U.S. Cl. ............... 345/156; 715/716; 715/745; 715/762; 715/863; 463/36; 463/37; 700/17; 700/46; 700/83; 455/566

(58) Field of Classification Search ........ 345/156–158, 345/184; 455/566, 574, 90; 463/36, 37; 700/17, 28, 46, 83; 715/703, 705, 716, 745, 715/762, 789, 811, 863, 864
See application file for complete search history.

(56) References Cited

U.S. PATENT DOCUMENTS 6,243,075 B1 6/2001 Fishkin et al.
6,268,857 B1 7/2001 Fishkin et al.
6,297,805 B1 10/2001 Adler et al.
6,297,838 B1 10/2001 Chang et al.
6,347,290 B1* 2/2002 Bartlett .................. 702/150
6,369,794 B1 4/2002 Sakurai et al.
6,466,197 B1* 10/2002 Kim et al. ............... 345/156
6,567,101 B1* 5/2003 Thomas .................. 345/649
6,798,429 B2* 9/2004 Bradski ................... 345/156
2004/0169636 A1* 9/2004 Park et al. ................ 345/156

FOREIGN PATENT DOCUMENTS

JP 06-004208 1/1994
JP 09-034675 2/1997
JP 11-143606 5/1999
JP 2000-148351 5/2000

* cited by examiner

Primary Examiner—Henry N. Tran

(57) ABSTRACT

An operation instructing device is included substantially at the center of a portable apparatus, and has a sensor for detecting motion values of the portable apparatus. A user performs various movements instructed by an instructing unit, while holding the portable apparatus. The motion values detected by the sensor are normalized by an analyzing unit, and then an area setting unit sets a movement detecting area personally for the user. An assigning unit obtains operation instructions for each function of the portable apparatus, and generates an operation instruction table in which each instruction operation is assigned to a sub area of the movement detection area. A judging unit judges within which sub area the motion value notified by the analyzing unit falls, and outputs the operation instruction that is assigned to the sub area within which the judging unit judged that the notified motion value falls.

10 Claims, 17 Drawing Sheets

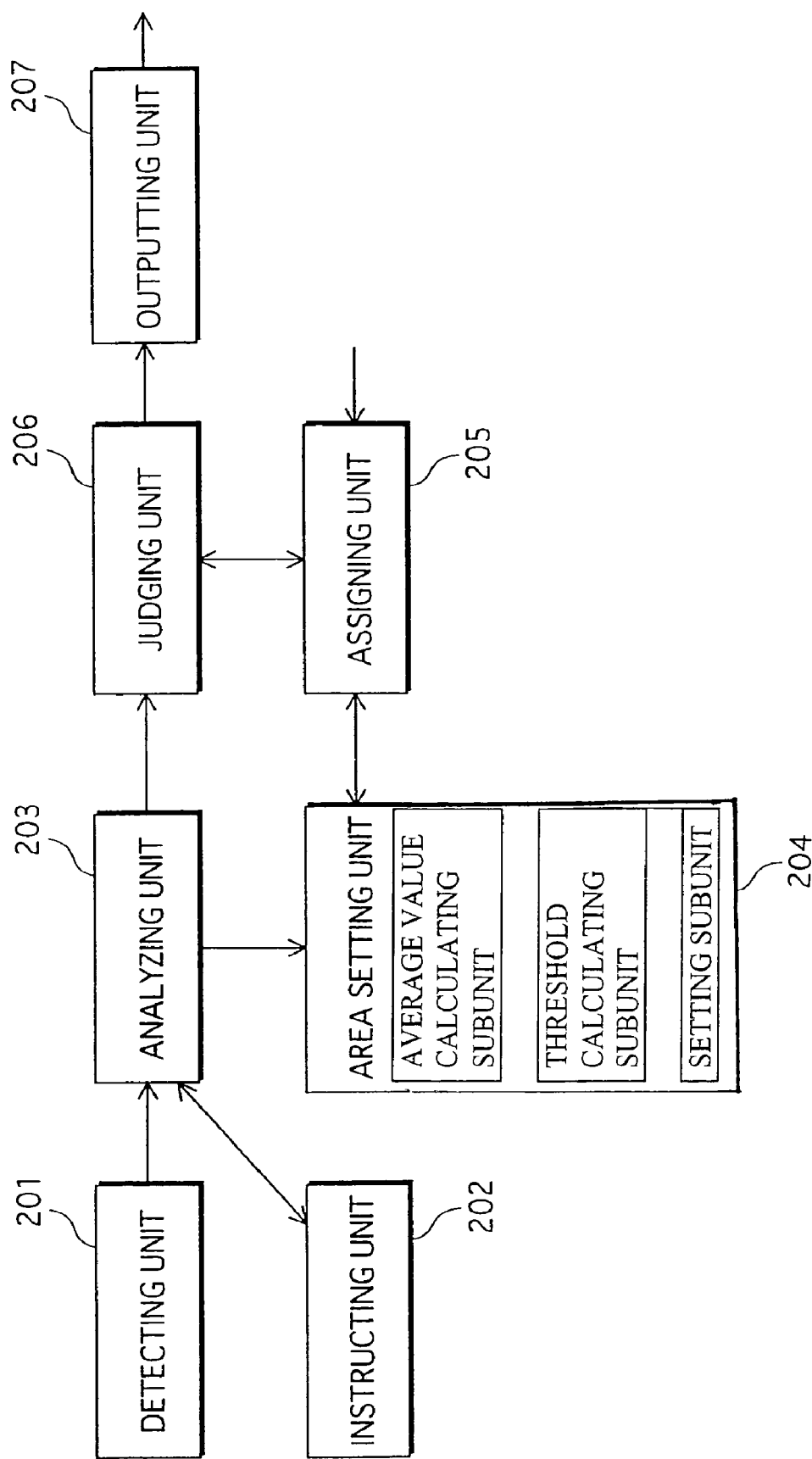

FIG.4
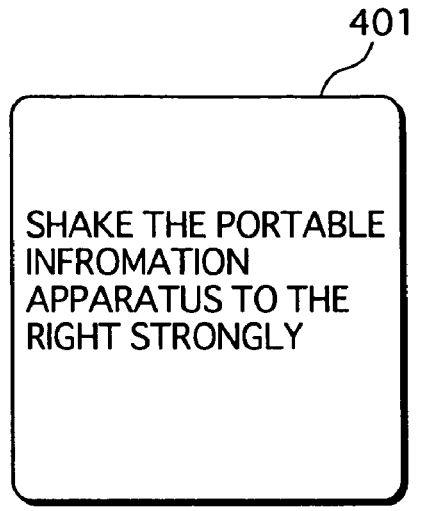
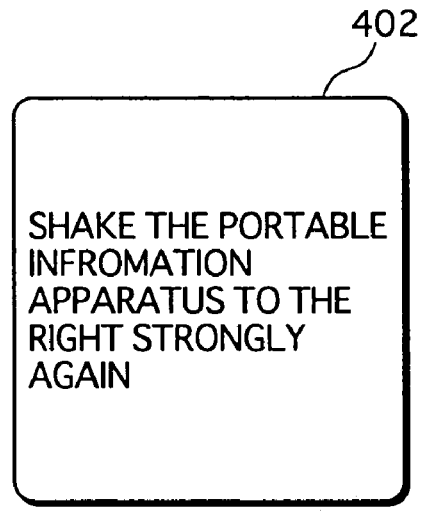
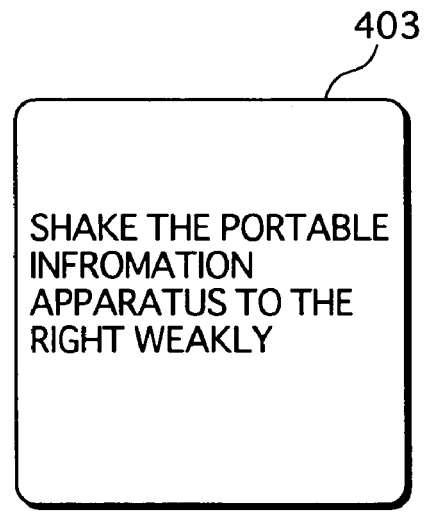

FIG.5

| DIRECTIONS \ NUMBER OF TIMES | 1 | 2 | 3 | 4 | 5 | 6 | 7 | 8 | 9 | 10 | AVERAGE |
|---|---|---|---|---|---|---|---|---|---|---|---|
| RIGHT (STRONG) | 87 | 50 | 90 | 75 | 71 | 110 | 96 | 88 | 78 | 65 | 82 |
| RIGHT (WEAK) | 46 | 36 | 37 | 39 | 43 | 35 | 44 | 45 | 38 | 37 | 40 |
| LEFT (STRONG) | 75 | 68 | 83 | 68 | 74 | 62 | 72 | 75 | 71 | 72 | 72 |

FIG.6

| USER | X | | | | Y | | | | Z | | | |
|---|---|---|---|---|---|---|---|---|---|---|---|---|
| | POSITIVE (RIGHT) | | NEGATIVE (LEFT) | | POSITIVE (UP) | | NEGATIVE (DOWN) | | POSITIVE (FRONT) | | NEGATIVE (BACK) | |
| | LOWER THRES-HOLD | UPPER THRES-HOLD | LOWER THRES-HOLD | UPPER THRES-HOLD | LOWER THRES-HOLD | UPPER THRES-HOLD | LOWER THRES-HOLD | UPPER THRES-HOLD | LOWER THRES-HOLD | UPPER THRES-HOLD | LOWER THRES-HOLD | UPPER THRES-HOLD |
| 1 | 19 | 61 | 31 | 72 | 36 | 81 | 18 | 63 | 25 | 56 | 38 | 73 |
| 2 | 37 | 66 | 19 | 52 | 32 | 68 | 27 | 68 | 23 | 50 | 38 | 62 |
| 3 | 33 | 56 | 28 | 62 | 28 | 62 | 24 | 63 | | | | |

FIG.7

| IDENTIFICATION NUMBER | FUNCTION NAME | NUMBER OF OPERATION INSTRUCTIONS | DIRECTIONS | OPERATION INSTRUCTIONS | AREA ASSIGNMENT |
|---|---|---|---|---|---|
| 1 | MENU OPERATION | 4 | LEFT | SHIFT FOCUS LEFT | 4 SUB AREAS IN 2-DIMENSIONAL AREA |
| | | | RIGHT | SHIFT FOCUS RIGHT | |
| | | | UP | SHIFT FOCUS UPWARD | |
| | | | DOWN | SHIFT FOCUS DOWNWARD | |

705 — IDENTIFICATION NUMBER
702 — FUNCTION NAME
703 — NUMBER OF OPERATION INSTRUCTIONS
704 — DIRECTIONS
701 — OPERATION INSTRUCTIONS

FIG.9

| IDENTIFICATION NUMBER | FUNCTION NAME | NUMBER OF OPERATION INSTRUCTIONS | OPERATION INSTRUCTIONS | | AREA ASSIGNMENT |
|---|---|---|---|---|---|
| | | | DIRECTIONS | OPERATION INSTRUCTIONS | |
| 2 | BROWSING WEB PAGE | 6 | UP | MOVE SLIDER (LINK) UPWARD | 6 SUB AREAS IN 3-DIMENSIONAL AREA |
| | | | DOWN | MOVE SLIDER (LINK) DOWNWARD | |
| | | | LEFT | MOVE SLIDER (LINK) LEFT | |
| | | | RIGHT | MOVE SLIDER (LINK) RIGHT | |
| | | | BACK | BACK TO PREVIOUS PAGE | |
| | | | FRONT | FORWARD TO NEXT PAGE | |

902 / 903 / 904 / 905 / 901

OPERATION INSTRUCTING DEVICE, OPERATION INSTRUCTING METHOD, AND OPERATION INSTRUCTING PROGRAM

BACKGROUND OF THE INVENTION (1) Field of the Invention

The present invention relates to an operation instructing device for outputting an operation instruction to a portable information apparatus that includes the operation indication device.

(2) Description of the Related Art

In recent years, portable information apparatuses such as mobile phones have become increasingly reduced in size, and a screen display area of such portable information apparatuses has also become smaller. Accordingly, it becomes important to limit contents to be displayed in one screen. On the other hand, the portable information apparatuses are designed to be more and more multi-functional, and such a portable information apparatus has over 100 menu items. Therefore, the menu items are put in a complicated menu hierarchy, and a user has to repeat pressing buttons over and over to select a desired menu item.

In order to complement the tangled button operation, the Japanese Laid-Open Patent Application No. H6-4208, for example, discloses a technique for detecting a movement of a main body of an information processor corresponding to a user movement, and for switching and scaling up and down contents displayed in a screen based on a direction and quantity of the detected movement.

Further, the U.S. Pat. No.6,369,794, for example, discloses a technique for identifying user movements such as "swing" and "tap" for instructing operations such as switching contents displayed in a screen of a portable information apparatus.

Both of the above techniques detect a motion value of a portable information apparatus and changes the contents displayed in the screen according to the detected motion value. Correspondence between motion values and operations are set statically in advance.

However, the user movements differ greatly in individuals. A motion value of a movement made by a user who is not physically strong can be too small and judged to be an error, and a predetermined operation such as switching the contents in the display screen could fail. Similarly, when a motion value of a user movement is too strong, it can be judged to be an error caused by an accident such as dropping the portable information apparatus on the ground, and the predetermined operation such as switching the contents in the display screen could also fail.

The user movements also differ in movement types of an individual user, and side-to-side movements of one user can be stronger than back-and-forth movements of the same user.

In other words, such a case could happen, in which the contents displayed in the screen can switch when the portable information apparatus is moved side to side, but do not switch when the portable information apparatus is moved back and forth.

SUMMARY OF THE INVENTION

The present invention is made in view of the above problem, and aims to provide an operation instructing device and a method capable of outputting a correct operation instruction to a portable information apparatus that includes the operation indication device.

The above object can be achieved by an operation instructing device-comprising: an area setting unit operable to set a movement detection area for a specific user, based on motion values resulting from movements unique to the user; and an operation unit operable to activate the area setting unit in response to an operation by the user.

By such a structure, the movement detection area can be set so as to correspond to movements that vary from user to user. Accordingly, it is possible to provide a operation instructing device that is set for one specific user and corresponds to the user's strength in movements.

Such an operation instructing device can also be achieved by the operation instructing device that is included in a portable apparatus, and further comprises: an instructing unit operable, when in a setting mode, to instruct a plurality of movements, the setting mode being a state in which the area setting unit is activated; a detecting unit operable to detect, for each of the instructed movements, motion values of the portable apparatus that result from user movements in accordance with the instructed movements; and an assigning unit operable to assign each of a plurality of operation instructions relating to a function of the portable apparatus to different sub areas of the movement detection area.

By such a structure, it is possible to assign each of the operation instructions to different sub areas of the movement detection area based on the user movements.

The above object can also be achieved by the operation instructing device such that the instructed movements are repeated a number of times, and include shaking movements of a strong strength and a weak strength in directions that are positive and negative along each of three axes of a three-dimensional space, the detecting unit is a three-dimensional acceleration sensor, and the area setting unit includes: an average value calculating subunit operable to store, for each time that each shaking movement is repeated, a maximum value of acceleration values detected by the sensor within a predetermined time period, and to calculate an average value for each shaking movement in each direction from the stored maximum values; a threshold calculating subunit operable to calculate, using an equation, lower and upper thresholds for each direction, based on the calculated average values for the weak and strong shaking movements in the direction; and a setting subunit operable to set the range between the lower and upper thresholds in each direction as one of the sub areas of the movement detection area.

By such a structure, it is possible to set the movement detection area so as to correctly recognize the user movements using the motion values detected by the detecting unit.

The above object can also be achieved by the operation instructing device further comprising: a judging unit operable to judge, when in a mode other than the setting mode, within which sub area each motion value detected by the detecting unit falls; and an instruction outputting unit operable to output, to the portable apparatus, the operation instruction assigned to the sub area within which the detected motion value is judged to fall.

By such a structure, user may have the operation instructing device output an operation instruction to the portable apparatus by performing a predetermined movement with holding the portable apparatus.

The above object can also be achieved by the operation instructing device further comprising an updating unit operable, when the motion value deviates from any of the sub areas, and the deviation is less than a predetermined value, to shift lower and upper thresholds of the sub area by the amount of the deviation.

By such a structure, it is possible to judge that the user movement has changed in a case in which the detected motion value slightly deviates from the movement detection area that has been set in the setting mode, and to update the movement detection area so as to enable to output the operation instruction by the user movements afterward.

The above object can also be achieved by the operation instructing device such that the threshold calculating unit uses $$LowTh = AvMxAcc(dir, w) - \frac{AvMxAcc(dir, s) - AvMxAcc(dir, w)}{2}$$

and $$UpTh = \frac{AvMxAcc(dir, s) + AvMxAcc(dir, w)}{2},$$

where "LowTh" indicates the lower threshold, "Upth" indicates the upper threshold, "AvMxAcc" indicates the average value of maximum acceleration values, "dir" indicates a direction in which the user performed the movement "w" indicates a weak movement, and "s" indicates a strong movement.

By such a structure, it is possible to correctly calculate the thresholds for setting the movement detection area using equations obtained experientially.

The above object can also be achieved by the operation instructing device such that the assigning unit selects one of one-dimensional, two-dimensional, and three-dimensional movement detection areas, according to a total number and directions of the operation instructions, and assigns each of the operation instructions to a sub area in a matching direction with a direction that the assigned operation instruction indicates.

By such a structure, a type of the movement detection area is selected, such as two-dimensional or three-dimensional, according to a total number and directions of the operation instructions. In addition, the user movements can be performed effectively because the direction that the operation instruction indicates and the direction of the user movement matches (shaking the portable apparatus to the right shifts the focus to the right, for example).

The above object can also be achieved by the operation instructing device such that the detecting unit is a three-dimensional acceleration sensor, and the area setting unit sets the movement detection area based on distances obtained by twice integrating acceleration values detected by the sensor.

By such a structure, it is possible to set the movement detection area by the distances converted from acceleration values detected by the sensor.

The above object can also be achieved by the operation instructing device such that the detecting unit is a gyroscope, and the assigning unit assigns each of the operation instructions to a different sub area, the operation instructions being for rotating a viewing direction of an image displayed on a screen of the portable apparatus, based on angular accelerations detected by the gyroscope.

By such a structure, the angular acceleration values as the motion values are detected, and the operation instructions to rotate a displayed image in the screen are assigned to the sub areas of the movement detection area. Accordingly, it is possible to view a displayed image from a different direction with movements intuitive to the user.

The above object can also be achieved by an operation instructing method in which a sensor included in a portable apparatus detects motion values of the portable apparatus that result from user movements, the method comprising the steps of: instructing a plurality of movements in a setting mode; detecting, by the sensor, motion values of the portable apparatus that result from the user movements; setting a movement detection area, based on motion values for each of the instructed movements; assigning each of a plurality of operation instructions relating to a function of the portable apparatus to different sub areas of the movement detection area; judging, when in a mode other than the setting mode, within which sub area the detected motion value falls; and outputting, to the portable apparatus, the operation instruction assigned to the sub area within which the detected motion value is judged to fall.

By such a method, the movement detecting area is set by the motion values of the portable apparatus that relate to the user movement are detected in the setting mode, and accordingly, it is possible to output accurate operation instructions to the portable apparatus that correspond to the movements of the specific user.

The above object can also be achieved by an operation instructing program that executes an operation instructing method in which a sensor included in a portable apparatus detects motion values of the portable apparatus that result from user movements, the program comprising the steps of: instructing a plurality of movements in a setting mode; detecting, by the sensor, motion values of the portable apparatus that result from the user movements; setting a movement detection area, based on motion values for each of the instructed movements; assigning each of a plurality of operation instructions relating to a function of the portable apparatus to different sub areas of the movement detection area; judging, when in a mode other than the setting mode, within which sub area the detected motion value falls; and outputting, to the portable apparatus, the operation instruction assigned to the sub area within which the detected motion value is judged to fall.

By having a computer to execute such a program, it is possible to achieve an operation instructing apparatus that corresponds to the movements of the specific user.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a structural diagram of the operation instructing device according the first embodiment of the present invention;

FIG. 4 shows examples of an instruction screen that is displayed in a displaying unit in the first embodiment;

FIG. 5 shows maximum acceleration values of both strong and weak movements in one of directions in that are notified to an area setting unit from an analyzing unit, and average maximum acceleration values that are calculated from the maximum acceleration values in the first embodiment;

FIG. 6 is a table showing an upper threshold and a lower threshold of a movement detection area that are set by the area setting unit of the user 1, and that of a user 2 as a comparison example in the first embodiment;

FIG. 7 is an operation instruction table showing the operation instructions notified to an assigning unit from the portable information apparatus in the first embodiment;

FIG. 9 is an operation instruction table showing another set of operation instructions notified to the assigning unit from the portable information apparatus in the first embodiment;

DESCRIPTION OF THE PREFERRED EMBODIMENT

The following describes an operation instructing device, an operation instructing method, and an operation instructing program according to preferred embodiments of the present invention with reference to the drawings.

First Embodiment

Figure 1:
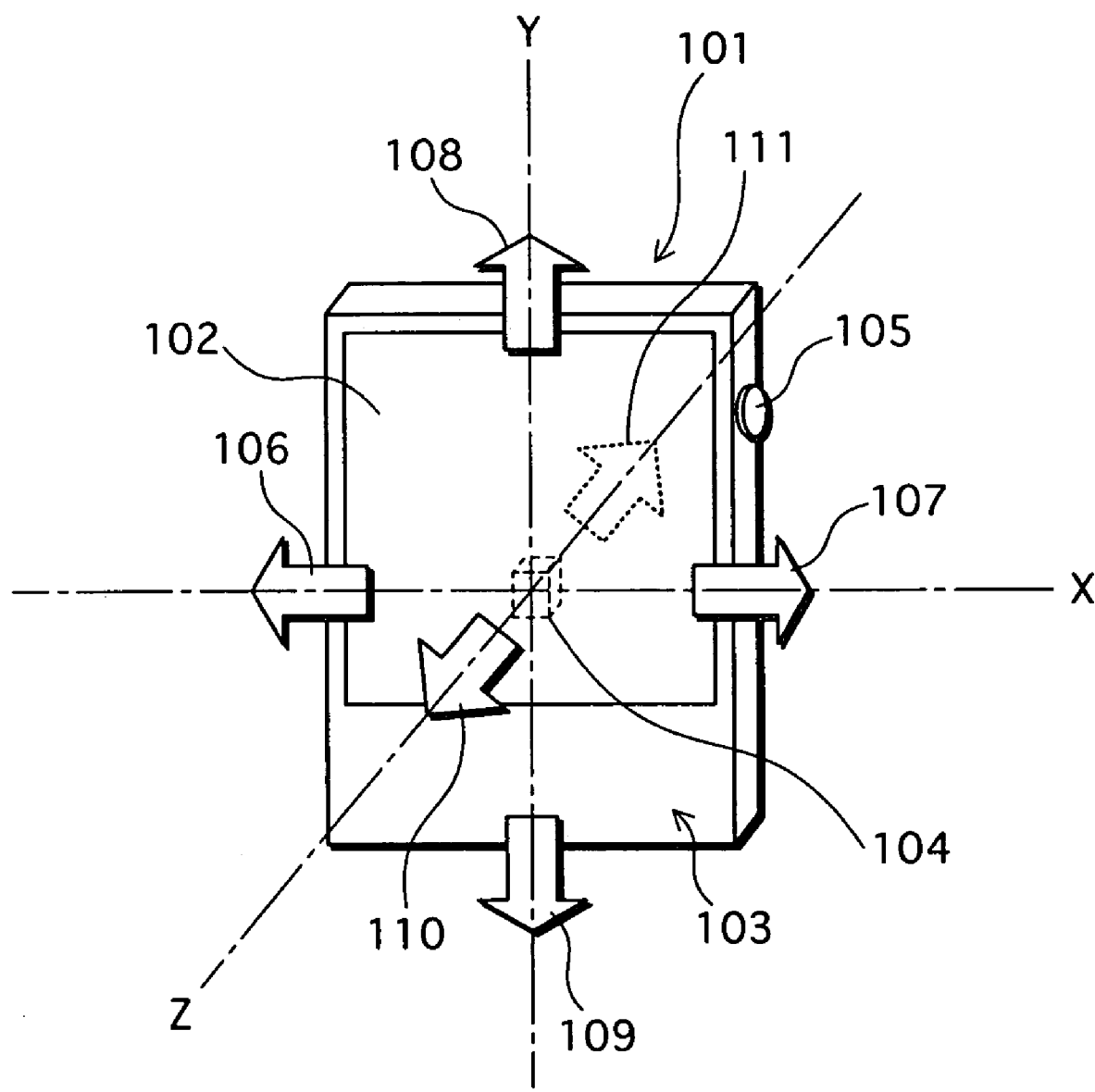
FIG. 1 shows an external view of a portable information apparatus of a first embodiment that includes an operation instructing device according to the present invention.

FIG. 1 shows an external view of a portable information apparatus of a first embodiment that includes an operation instructing device according to the present invention.

A portable information apparatus 101 includes a displaying unit 102 for displaying information on a front surface of the portable information apparatus 101. At substantially a center of a housing 103 of the portable information apparatus 101, a three-dimensional acceleration sensor 104 is included. On a right-hand side surface of the housing 103, a movement recognition button 105 is disposed.

A user holds the portable information apparatus 101 by the housing 103. When the movement recognition button 105 is pressed, the three-dimensional acceleration sensor 104 detects and outputs acceleration values of a movement of the housing 103.

In FIG. 1, the three-dimensional acceleration sensor is at a center, a direction indicated by arrows 106 and 107 is an X axis, a direction indicated by arrows 108 and 109 is a Y axis, and a direction indicated by arrows 110 and 111 is a Z axis. The acceleration values of the movement outputted by the three-dimensional acceleration sensor 104 are positive if the movement is in a direction of arrows 106, 108, or 110, and negative if the movement is in directions of arrows 107, 109, or 111.

FIG. 2 is a structural diagram of the operation instructing device according to the present invention in the first embodiment.

The operation instructing device illustrated in this drawing includes a detecting unit 201, an instructing unit 202, an analyzing unit 203, an area setting unit 204, an assigning unit 205, a judging unit 206, and an outputting unit 207.

The detecting unit 201 is, for example, the three-dimensional acceleration sensor 104, and detects movements of the portable information apparatus 101 that includes the operation instructing device, and outputs acceleration values to the analyzing unit 203. The detected acceleration values are outputted either while the movement recognition button 105 is being pressed, or for a predetermined time period after the movement recognition button 105 is pressed (e.g. 0.5 seconds).

Figure 3B:
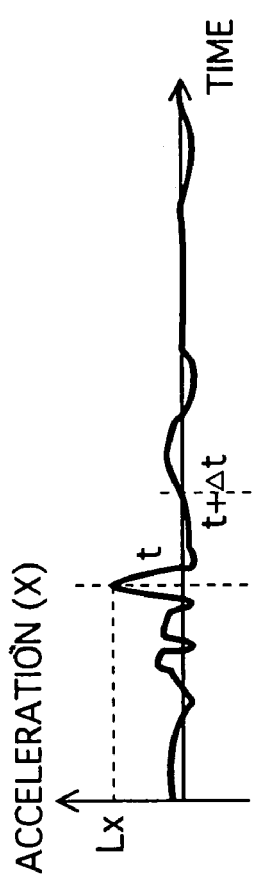
FIGS. 3A, B, C, and D are diagrams explaining acceleration values detected by the detecting unit of the first embodiment.
Figure 3C:
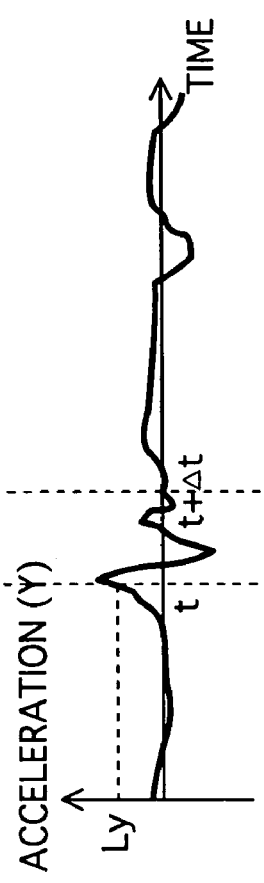
Figure 3D:
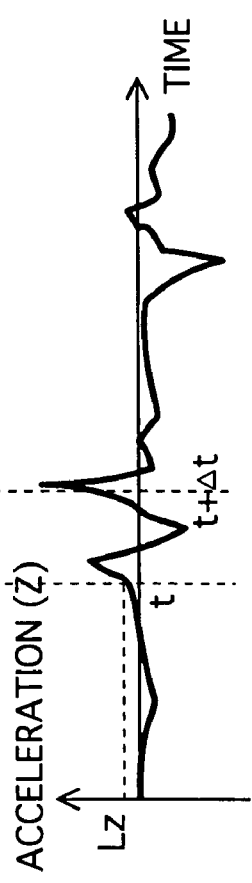
Figure 3A:
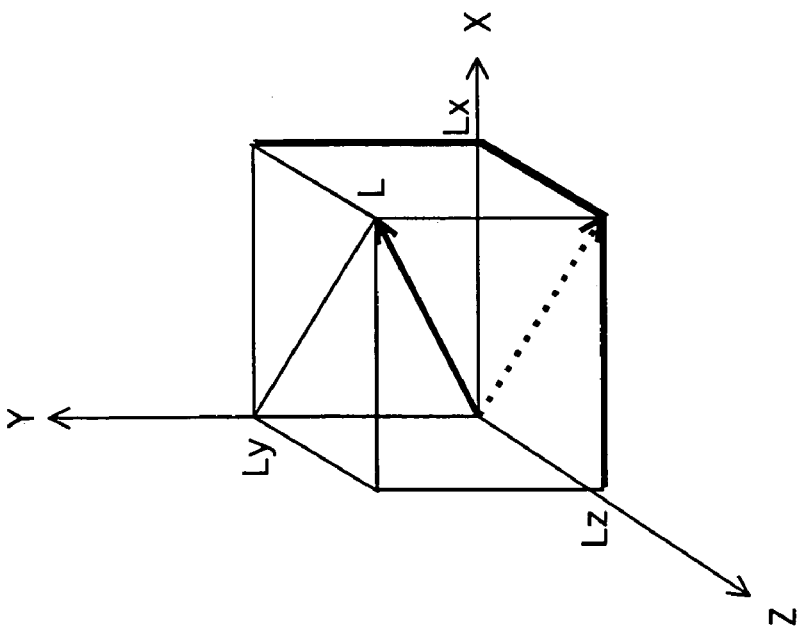

FIGS. 3A, B, C, and D are diagrams explaining the acceleration values detected by the detecting unit 201. As shown in FIG. 3A, X, Y, and Z axes are set, with a center of the three-dimensional acceleration sensor 104 as an origin. When the housing 103 is moved, acceleration values for each axis is detected as shown in FIGS. 3B, C, and D.

Given that average values in waveforms for X, Y, and Z axes as, Lx, Ly, and Lz, respectively, a direction vector L at a time t is shown by an equation (1). The direction vector obtained by the equation (1) indicates a direction from the origin (the center of the three-dimensional acceleration sensor 104).

$$\vec{L} = Lx\vec{X} + Ly\vec{Y} + Lz\vec{Z} \qquad (1)$$

When the movement recognition button 105 is pressed at the time t, the detecting unit 201 outputs the detected acceleration values to the analyzing unit 203 at a specific interval (1/100 seconds, for example) for a predetermined time period $\Delta t$.

The instructing unit 202 displays a screen for instructing a user movement to be performed with holding the housing 103 when the operation instructing device is in a setting mode.

The setting mode can be selected from a menu screen that is displayed when the portable information apparatus 101 is turned on. A reset switch is also displayed in the menu screen and the portable information apparatus can also enter the setting mode by selecting the reset switch when the user who uses the portable information apparatus 101 changes.

FIG. 4 shows examples of the instruction screen that is displayed in the displaying unit 102 of the portable information apparatus 101 according to instructions from the instructing unit 202. A screen 401 displays a message such as, "shake the portable information apparatus to the right strongly". In a case in which the user performs a different movement from the instruction shown in the screen 401, the analyzing unit 203 outputs an error and a new message such as illustrated in a screen 402 is displayed. A screen 403 displays a message instructing the next movement such as, "shake the portable information apparatus to the right weakly". Further, messages instructing the user to shake both strongly and weakly to the all directions shown by the arrows 106, 108, 109, 110, and 111 as illustrated in FIG. 1 are displayed.

When the user holds the housing 103 of the portable information apparatus 101 and performs the movements in response to the instruction messages, the detecting unit 201 detects and outputs the acceleration values to the analyzing unit 203.

The instructions made by the instructing unit 202 are also notified the analyzing unit 203.

In a case in which the analyzing unit 203 has received a notification about the instruction from the instructing unit 202, the analyzing unit 203 notifies the instructing unit 202 of an error if a sign of the acceleration values outputted from the detecting unit 201 do not match the notified instruction. Specifically, when the instruction is to shake the portable information apparatus to the right, the movement matches the instruction if the detected acceleration values show positive, whereas the movement does not match the instruction if the detected acceleration values show negative. In the latter case, the analyzing unit 203 notifies the instructing unit 202 of an error.

The analyzing unit 203 notifies the area setting unit 204 of a maximum acceleration value of a series of acceleration values outputted from the detecting unit 201, such as acceleration values outputted during the time Δt, along with the direction and an instructed strength of the movement.

When the portable information apparatus is not in the setting mode, the analyzing unit 203 notifies the judging unit 206 of the direction and the maximum value.

The analyzing unit 203 normalizes the acceleration values outputted from the detecting unit 201, setting. +2G to 127, and −2G to −127, and notifies either the area setting unit 204 or the judging unit 206 of the normalized result.

The area setting unit 204 calculates an average of the maximum acceleration values for strong and weak movement in each direction.

FIG. 5 shows maximum acceleration values of movements performed by a user 1 and the average value of the maximum acceleration values that are stored in a memory unit of the area setting unit 204. Each of sub areas of the movement detection area is set based on the average acceleration of both strong and weak movements in the corresponding direction. Signs for the acceleration values are not illustrated in the drawing.

Although, in FIG. 5, the acceleration values are detected 10 times per movement, it is possible to set an adequate movement detection area by calculating an average value with at least three samplings.

A lower threshold "LowTh" and an upper threshold "UpTh" for each direction are calculated from equations (2) and (3), respectively. In the equations, "AvMxAcc" indicates an average maximum acceleration value, "dir" indicates a direction in which the user performed the movement, "w" indicates a weak user movement, and "s" indicates a strong user movement.

$$LowTh = AvMxAcc(dir, w) - \frac{AvMxAcc(dir, s) - AvMxAcc(dir, w)}{2} \quad (2)$$

$$UpTh = \frac{AvMxAcc(dir, s) + AvMxAcc(dir, w)}{2} \quad (3)$$

The following equations (4) and (5) shows solutions, when average maximum acceleration values 502 and 503 for both strong and weak user movements in a direction 501 (right) in FIG. 5 are substituted in the equation (2) and (3).

$$LowTh = 40 - \frac{82 - 40}{2} = 19 \quad (4)$$

$$UpTh = \frac{82 + 40}{2} = 61 \quad (5)$$

Thus, the lower threshold and the upper threshold for the sub area of the movement detection area on the right are obtained by the equations (4) and (5).

The area setting unit 204 sets the range between the lower threshold and upper threshold as a sub area of the movement detection area to detect the shaking movement to the right by the user 1. In other words, the area setting unit 204 sets the range indicated by the acceleration values 19 to 61 that is notified by the by the analyzing unit 203.

The area setting unit 204 sets the sub areas of the movement detection area for both positive and negative directions of each of X, Y, and Z axes, and notifies assigning unit 205 of the set sub areas.

Each sub area is set separately for each direction, and accordingly, if a judgment is made based on only one dimension (one axis), then the areas for other directions are not involved in the judgment. If a judgment is made based on two dimensional plane (two axes) or three dimensional space (three axes), other corresponding areas are involved in the judgment.

FIG. 6 is a table for comparison, showing the upper and lower thresholds of a movement detection area of the user 1 set by the area setting unit 204, and that of a user 2 set by another area setting unit of another operation instructing device.

Comparing a movement 601 (right) and a movement 602 (left) of the user 1, acceleration values for the movement 602 is higher than those of the movement 601. This shows that the strength in movement performed by the same person can differ in directions.

In addition, comparison between the strength of the movement 601 (right) of the user 1 and a movement 603 (right) of the user 2 shows the strength also varies from individual to individual.

Due to the differences shown in the above, using a static movement detection area regardless of users as in the conventional art could cause inconvenience such as a user operation is wrongly recognized as an error.

The area setting unit 204 sets a new movement detection area and abandons a previously set movement detection area when the reset switch (not shown in the drawings) is selected, because the selection of the reset switch indicates that the user who uses the operation instructing device is now different.

The assigning unit 205 receives notifications about operation instructions for each function from the portable information apparatus 101, and then assigns the operation instructions to the sub areas of the movement detection area set by the area setting unit 204.

FIG. 7 is an operation instruction table of a function for shifting a focus as an example of the operation instructions notified to the assigning unit 205. In this table, a function name 702 indicating an assigned function is "operation menus" and an operation number 703 indicating a number of operations is "4". Operation instructions 701 for the function 702 correspond to directions of a focus shift, directions 704 indicating directions of the user movements each correspond to X and Y directions, "right", "left", "up", and "down". An identification number 705 for identifying the operation instruction table is "1".

Figure 8:
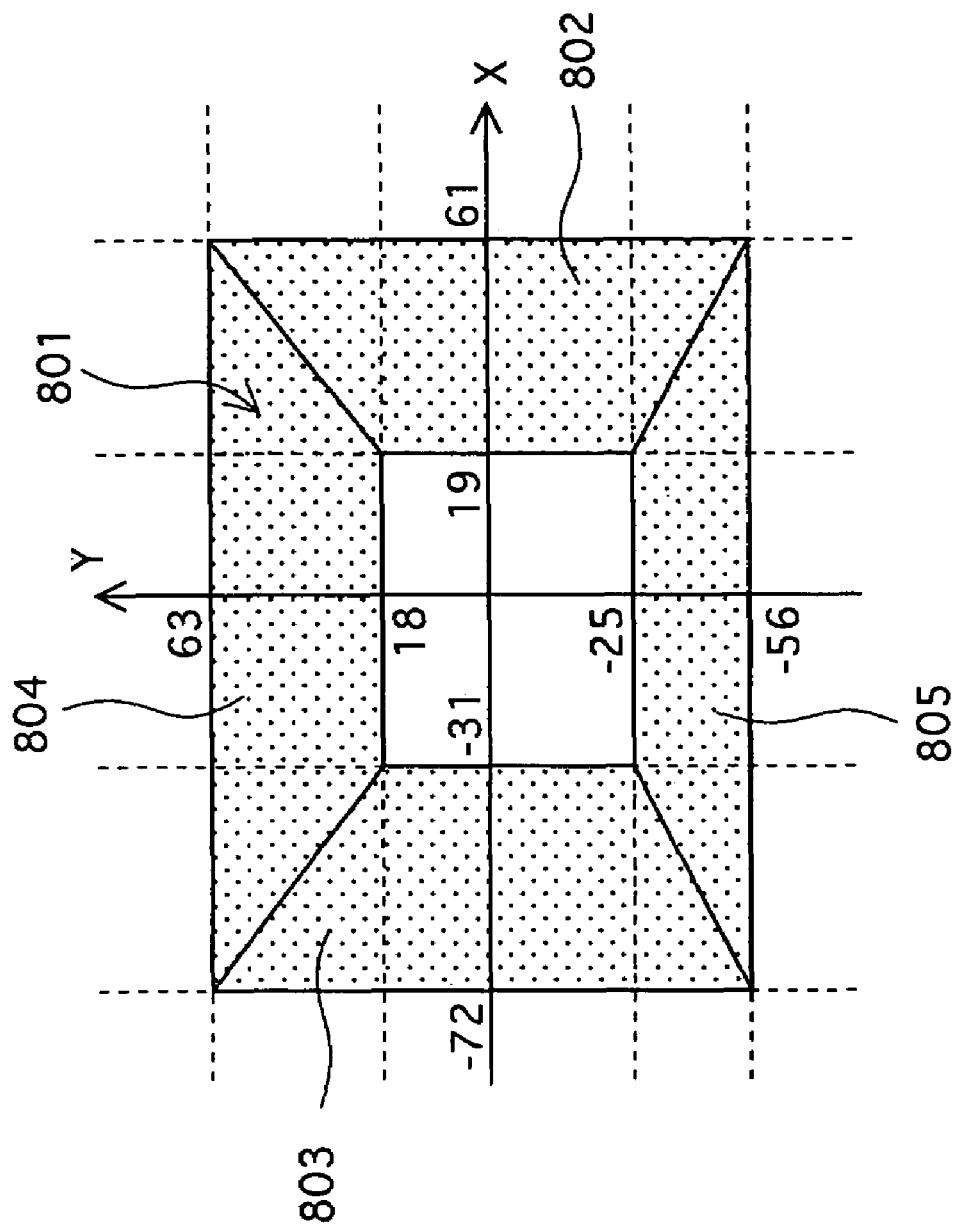
FIG. 8 is a diagram illustrating a movement detection area to which the operation instructions are assigned by the assigning unit in the first embodiment.

The assigning unit 205 assigns each operation instruction to each of the sub areas of the movement detection area as shown in FIG. 8.

A movement detection area 801 includes sub areas 802–805. The sub area 802 is between a lower and upper thresholds for the rightward movement, the sub area 803 is between a lower and upper thresholds for the leftward movement, the sub area 804 is between a lower and upper thresholds for the upward movement, and the,sub area 805 is between a lower and upper thresholds for the downward movement. The operation instructions for shifting the focus toward "right", "left", "up", and "down" directions are assigned to the sub areas 802, 803, 804, and 805, respectively. Each intersection of two lower thresholds and a corresponding intersection of two upper thresholds are connected with a straight line so as to divide the sub areas.

The movement detection area 801 after the assignment is divided into 4 sub areas in the two dimensional plane.

The assigning unit 205 assigns each of the operation instructions 701 to each of the sub areas 802–805 in the movement detection area 801, and then attaches an identification number "1" to the function and stores the operation instruction table.

As has been described above, it is possible to operate the portable information apparatus 101 with an intuitive operation by making correspondence between each of the operation instructions assigned to the movement detection area 801 and the user movements.

In other words, a user movement "left shake" with holding the housing 103 corresponds to an operation instruction "shift focus to left", a user movement "right shake" with holding the housing 103 corresponds to an operation instruction "shift focus to right", a user movement "up shake" with holding the housing 103 corresponds to an operation instruction "shift focus to upward", and a user movement "down shake" withholding the housing 103 corresponds to an operation instruction "shift focus to downward".

FIG. 9 is an operation instruction table for a different function.

An identification number 902 that corresponds to operation instructions 901 is "2", and a function name 903 indicating a function for the operation instructions 901 is "browsing web page". A number of operation 904 is "6", and directions 905 indicate directions in three axes: up-down, right-left, and back-front.

The assigning unit 205 spatially divides the movement detection area set by the area setting unit 204 into 6 sub areas, and assigns each of the operation instructions 901 to a different one of the sub areas.

Figure 10:
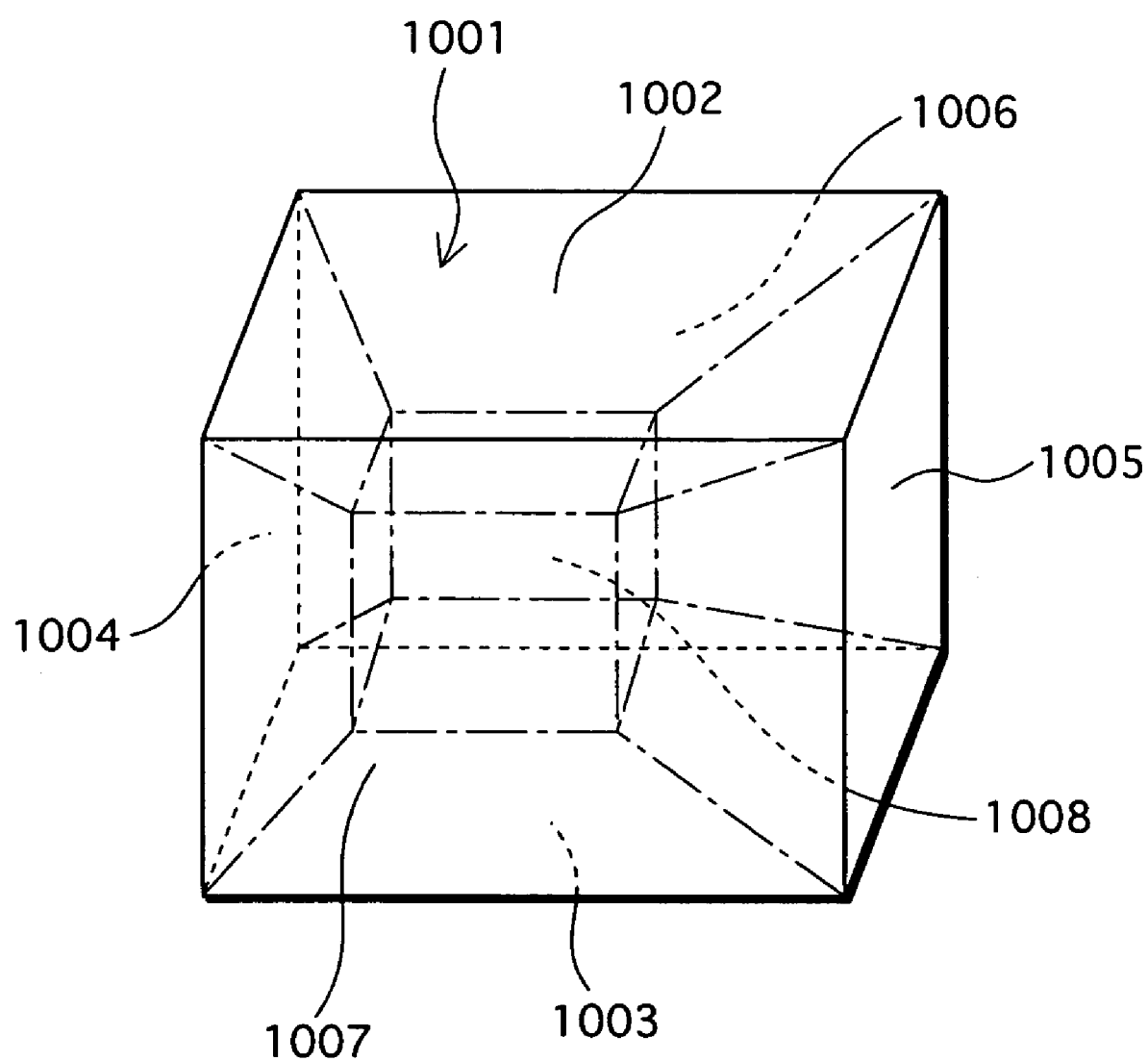
FIG. 10 is a diagram illustrating a movement detection area to which the another set of operation instructions are assigned by the assigning unit in the first embodiment.

FIG. 10 is a diagram to explain a movement detection area 1001. Specifically, "move slider (link) upward" is assigned to a sub area 1002, "move slider (link) downward" is assigned to a sub area 1003, "move slider (link) left" is assigned to a sub area 1004, "move slider (link) right" is assigned to a sub area 1005, "back to previous page" is assigned to a sub area 1006, and "move to next page" is assigned to a sub area 1007 of the movement detection area 1001, respectively.

The assigning unit 205 assigns each of the operation instructions 901 to each of the sub areas 1002–1007 in the movement detection area 1001, and then attaches an identification number "2" to the function and stores the operation instruction table.

Further, the assigning unit 205 is notified, from the portable information apparatus 101, of the identification number corresponding to contents currently displayed in the displaying unit 102.

When the portable information apparatus 101 is not in the setting mode and a menu is displayed in the displaying unit 102, and if the user 1 holds the portable information apparatus 101 and shakes it upward after or while pressing the portable information apparatus 101, the detecting unit 201 detects acceleration values of the movement and outputs the detected average values to the analyzing unit 203 at a predetermined interval.

The analyzing unit 203 normalizes the inputted acceleration values, and notifies the judging unit 206 of maximum values for each direction along X, Y, and Z axes.

The judging unit 206, upon reception of the maximum values for the directions along the X, Y, and Z axes notified from analyzing unit 203, judges in which area the notified acceleration values fall within in the operation instruction table stored in the assigning unit 205. The operation instruction table that is referred to has the same identification number as that of the contents displayed in the displaying unit 102 that the assigning unit 205 has already been notified of from the portable information apparatus 101.

As in the above, the menu is currently displayed in the displaying unit 102, and accordingly, the identification number "1" is notified to the assigning unit 205. Therefore, an operation instruction table having an identification number "1" is selected.

Figure 11:
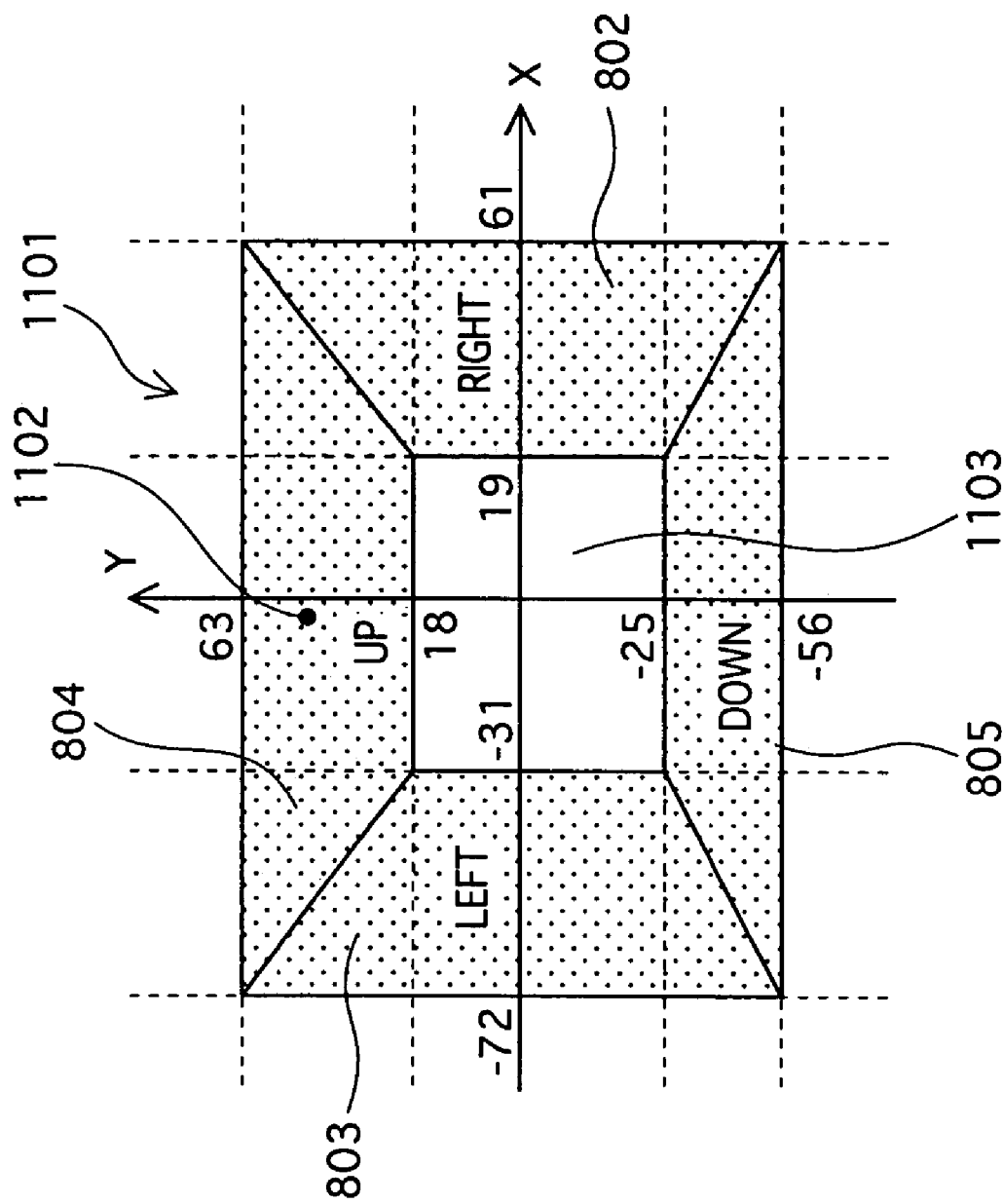
FIG. 11 is a schematic view of an operation instruction table that is stored in the assigning unit in the first embodiment.

FIG. 11 is a schematic diagram illustrating an operation instruction table having the identification number "1". Each of the instructions for the focus shift corresponding to the user movements "right", "left", "up", and "down" is assigned to one of the sub areas 802–805 of an operation instruction table 1101, respectively.

When the notified maximum acceleration values for the directions along the X, Y, and Z axes are −5, 40, and 1, respectively, a direction vector for this coordinates is at a point 1102. In this case, the point 1102 is judged to be in the sub area 804, read the corresponding operation instruction "move focus up", and then notifies the read operation instruction to the outputting unit 207.

When the direction vector falls within the rectangular area that is surrounded by the sub areas 802–805, the judging unit 206 judges the user movement to be an error, and any operation instruction is not notified. When the direction vector falls within the area outside the sub areas 802–805, the judging unit 206 also judges the user movement to be an error, and any operation instruction is not notified.

When the direction vector is near a boundary of two sub areas, the user movement can be judged by such an equation (6), when A<X<B and C<Y<D, for example. In the equation (6), A indicates a lower threshold in a rightward direction, B indicates an upper threshold in a rightward direction, C indicates a lower threshold in an upward direction, and D indicates an upper threshold in an upward direction.

$$S = \frac{D-C}{B-A} - \frac{Y-C}{X-A} \qquad (6)$$

When S in the equation (6) is positive, the user movement is judged to be in the sub area 802. When S is negative, the user movement is judged to be in the sub area 804. A similar judgment is made when the direction vector is near a boundary between any sub areas.

Further, in a case in which the operation instruction table having the identification number "2", the judging unit 206 also judges a location of the direction vector out of the sub areas 1002–1007. The judging unit 206 also judges that the direction vector to be an error when the direction vector falls within an area 1008 surrounded by the sub areas 1002–1007 as shown in FIG. 10.

The outputting unit 207 outputs the operation instruction notified from the judging unit 206 to the portable information apparatus 101.

By this, the portable information apparatus 101 performs the instructed operation such as updating the displayed contents in the displaying unit 102.

Figure 12:
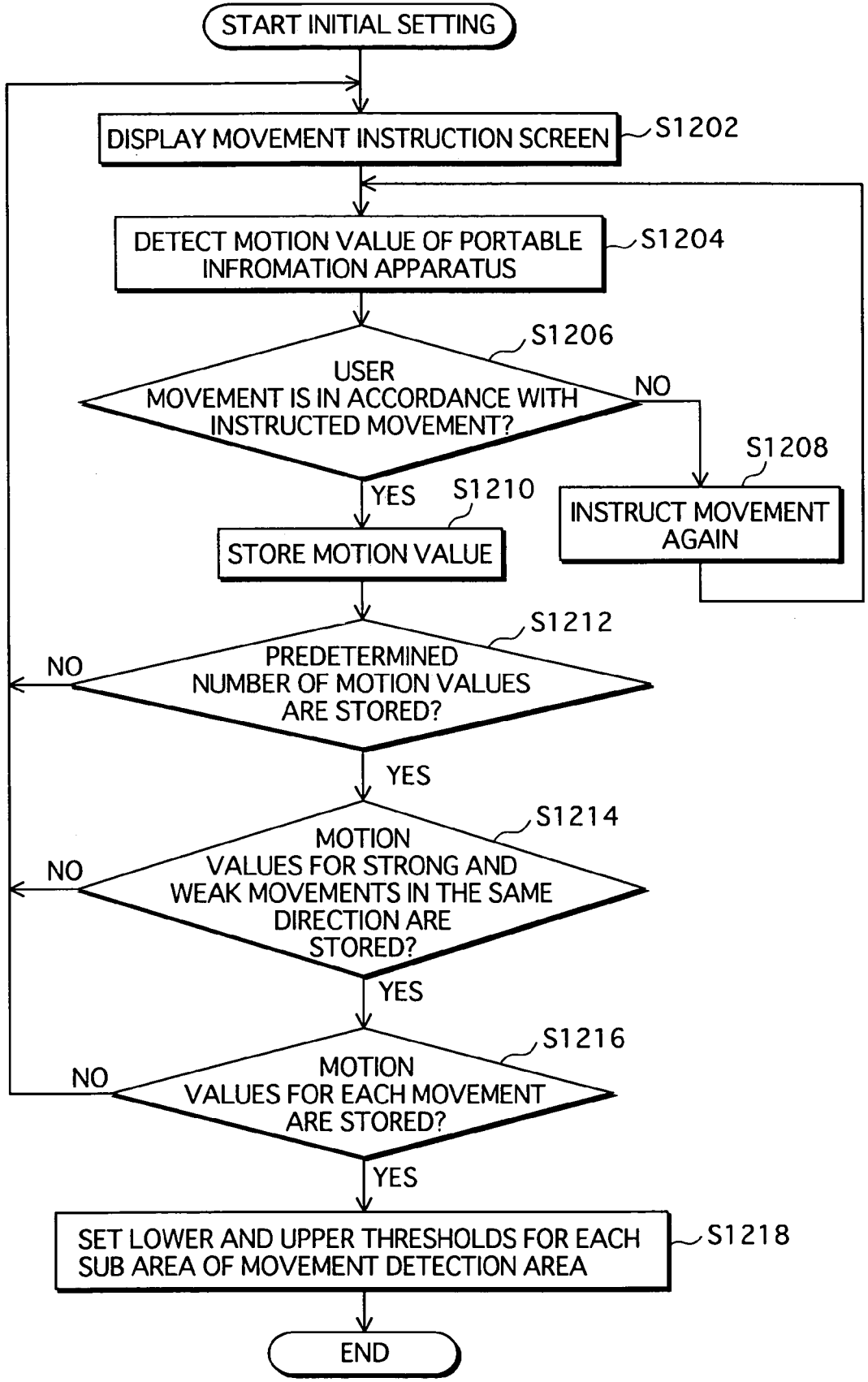
FIG. 12 is a flow chart explaining an operation for setting an movement detection area in the first embodiment.
Figure 13:
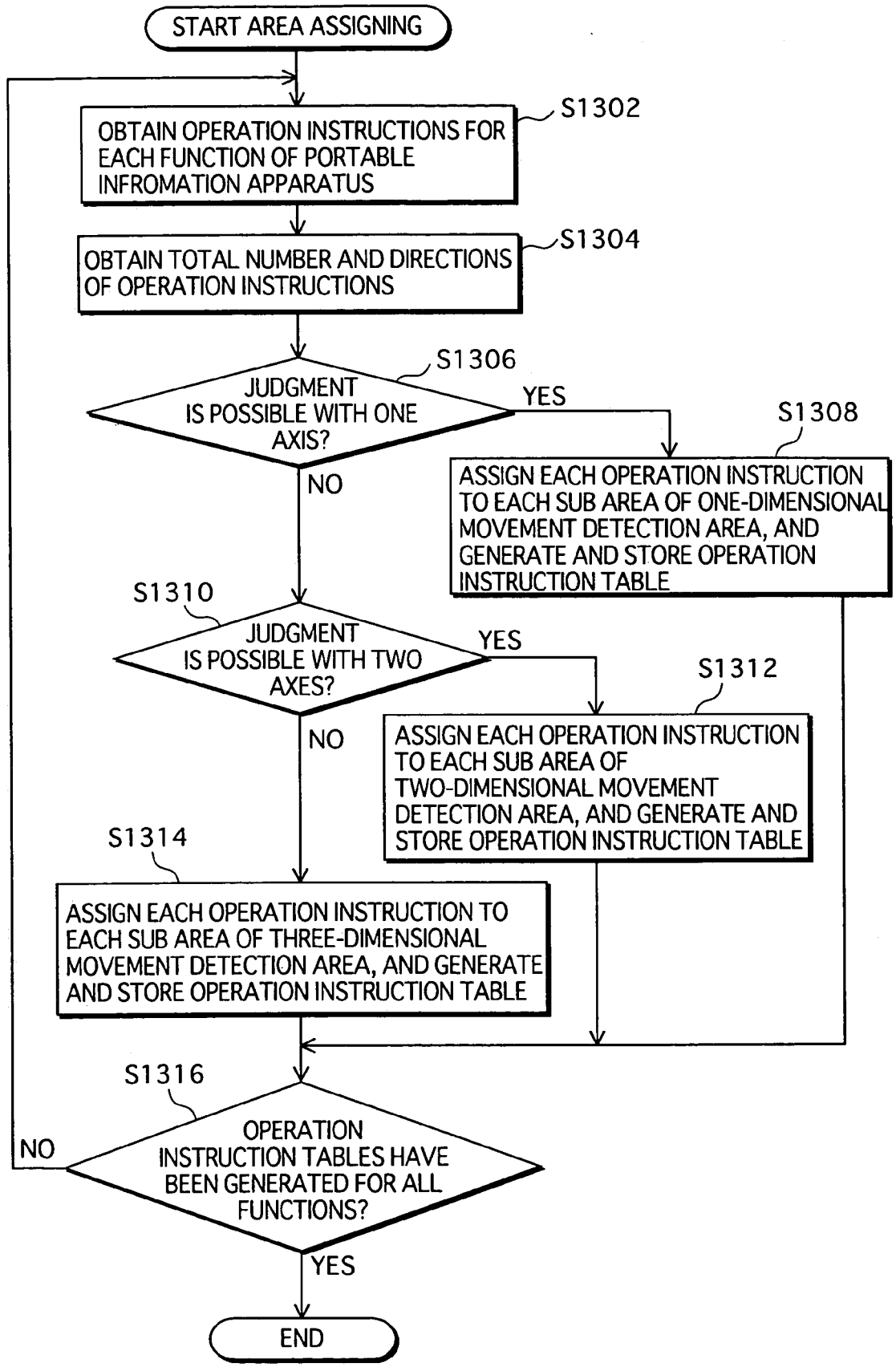
FIG. 13 is a flow chart explaining an operation for assigning the operation instructions to the movement detection area in the first embodiment.
Figure 14:
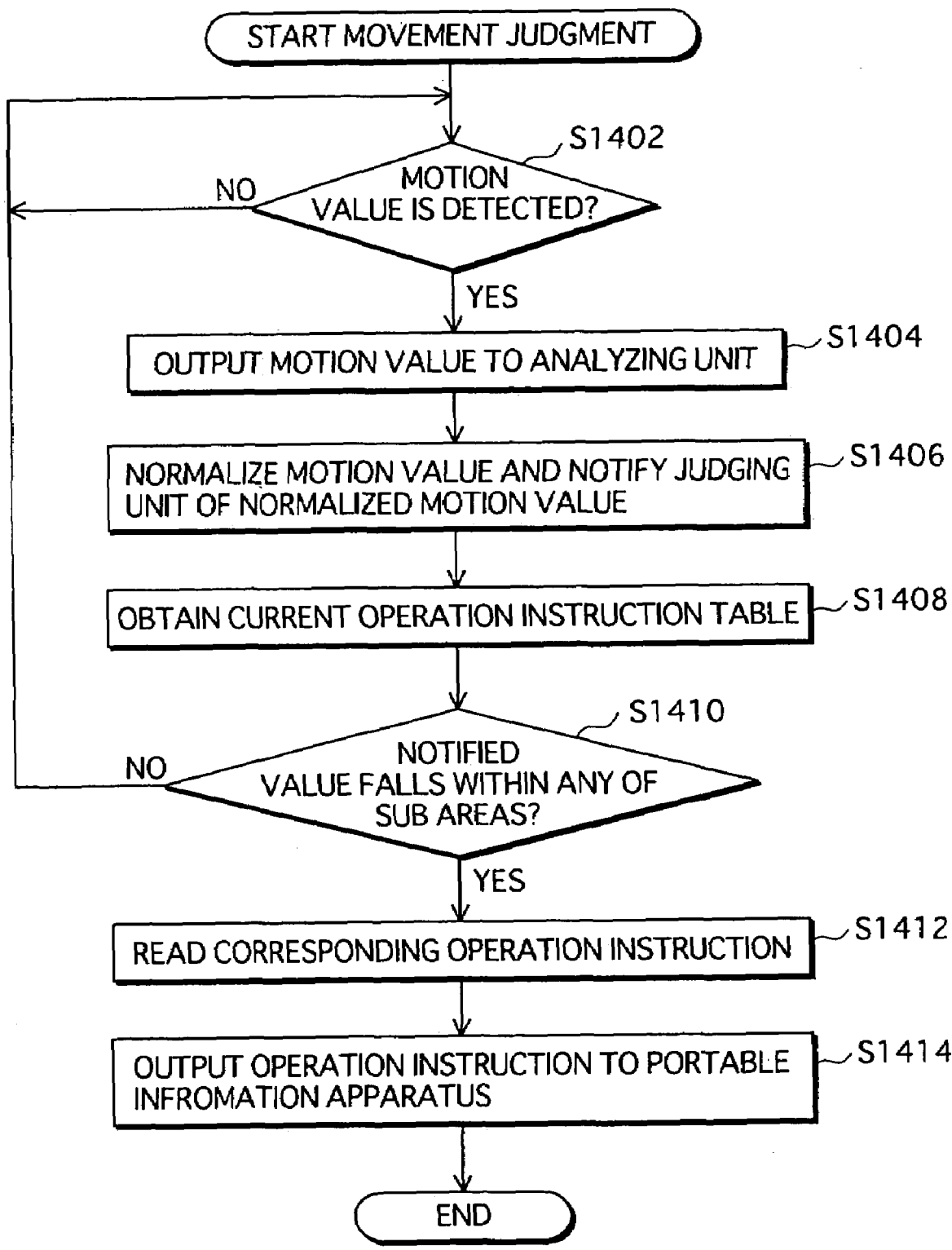
FIG. 14 is a flow chart explaining an operation in a judging unit in the first embodiment.

Next, an operation of the above embodiment is detailed in accordance with flow charts illustrated in FIGS. 12–14.

FIG. 12 is a flow chart explaining an operation in the setting mode.

First, the instructing unit 202 have the displaying unit 102 display an instruction screen instructing the user movements that the user is expected to perform with holding the housing 103 (S1202).

When the user presses the movement recognition button 105 and moves the housing 103, the detecting unit 201 detects acceleration values of the movement of the main body of the portable information apparatus 101. The detected acceleration values are motion values of the main body of the portable information apparatus 101, and outputted to the analyzing unit 203 (S1204).

The analyzing unit 203 judges if the inputted motion value corresponds to the instructed movement (S1206).

When the motion value does not correspond to the instructed movement, the instructing unit 202 have the displaying unit 102 display the instruction screen instructing the user movements again (S1208). Then, the operation returns to S1204.

When the motion value corresponds to the instructed movement, the area setting unit 204 is notified of the motion value from the analyzing unit 203 and records the received motion value (S1210), and then judges if the motion value has been recorded for a predetermined number of times (S1212). If the judgment result is negative, the operation returns to S1202, and if the judgment result is affirmative, the area setting unit 204 further judges if the recorded motion values are for both strong and weak user movements (S1214). If the judgment result is negative, the operation returns to S1202, and if the judgment result is affirmative, the area setting unit 204 further judges if the recorded motion values are for the user movements for all directions (S1216). If the judgment result is negative, the operation returns to S1202, and if the judgment result is affirmative; the area setting unit 204 sets the lower threshold and upper threshold of a movement detection area in each direction (S1218), and the operation ends.

FIG. 13 is a flow chart explaining an operation of the assigning unit.

The assigning unit 205 obtains operation instructions of the portable information apparatus 101 by functions (S1302) and also obtains the number of operations and the directions (S1304).

Next, the assigning unit 205 judges, by the obtained number of operations and the obtained directions, if the operations can be assigned only by 1 axis (S1306). The assigning unit 205 confirms that the operations can be assigned only with one axis when the obtained directions are "up and down" or "right and left", for example. In this case, the assigning unit 205 assigns each of the operation instructions to each of the sub areas of the movement detection area in a one-dimensional space, generates an operation instruction table, and stores the generated operation instruction table (S1308). Then, the operation moves to S1316.

If the operations can not be assigned with one axis, the assigning unit 205 judges if the operations can be assigned using two axes (S1310). The assigning unit 205 judges that the operations can be assigned using the two axes when the obtained directions are "right and up" or "right, left, up and down", for example. In this case, the assigning unit 205 assigns each of the operation instructions to each of the sub areas of the movement detection area in a two-dimensional plane, generates an operation instruction table, and stores the generated operation instruction table (S1312). Then, the operation moves to S1316.

If the operations can not be assigned using two axes, in other words, when the obtained directions are "right, up, down and back" or "right, left, up, down, back, and front", for example, the assigning unit 205 assigns each of the operation instructions to each of the sub areas of the movement detection area in a three-dimensional space, generates an operation instruction table, and stores the generated operation instruction table (S1314).

In S1316, the assigning unit 205 judges if operation instruction tables have been generated for all functions (S1316). If there is any function that does not has a corresponding operation instruction table, the operation returns to S1302. If the operation instruction tables have been generated for all functions, the operation ends.

FIG. 14 is a flow chart explaining an operation on how to determine an operation instruction from the motion value of the main body of the portable information apparatus 101.

The detecting unit 201 waits for the acceleration values as the motion values being detected (S1402), and then outputs the motion values to the analyzing unit 203 (S1404).

The analyzing unit 203 normalizes the inputted motion values and notifies the judging unit 206 of a maximum motion value (S1406).

The judging unit 206 obtains, from tables that are stored in the assigning unit 205, an operation instruction table for a function that is currently selected by the portable information apparatus 101 (S1408). The judging unit 206 then judges if the notified motion value falls within any of the sub areas of the movement detection area (S1410).

If the notified motion value does not fall within any of the sub areas of the movement detection area, the operation returns to S1402. If the notified motion value falls within any of the sub areas of the movement detection area, the operation instructions assigned to the sub area is read (S1412).

When the outputting unit 207 receives a notification of the read operation instruction from the judging unit 206, the outputting unit 207 outputs the received operation instruction to the portable information apparatus 101 (S1414), and the operation ends.

Second Embodiment

Figure 15:
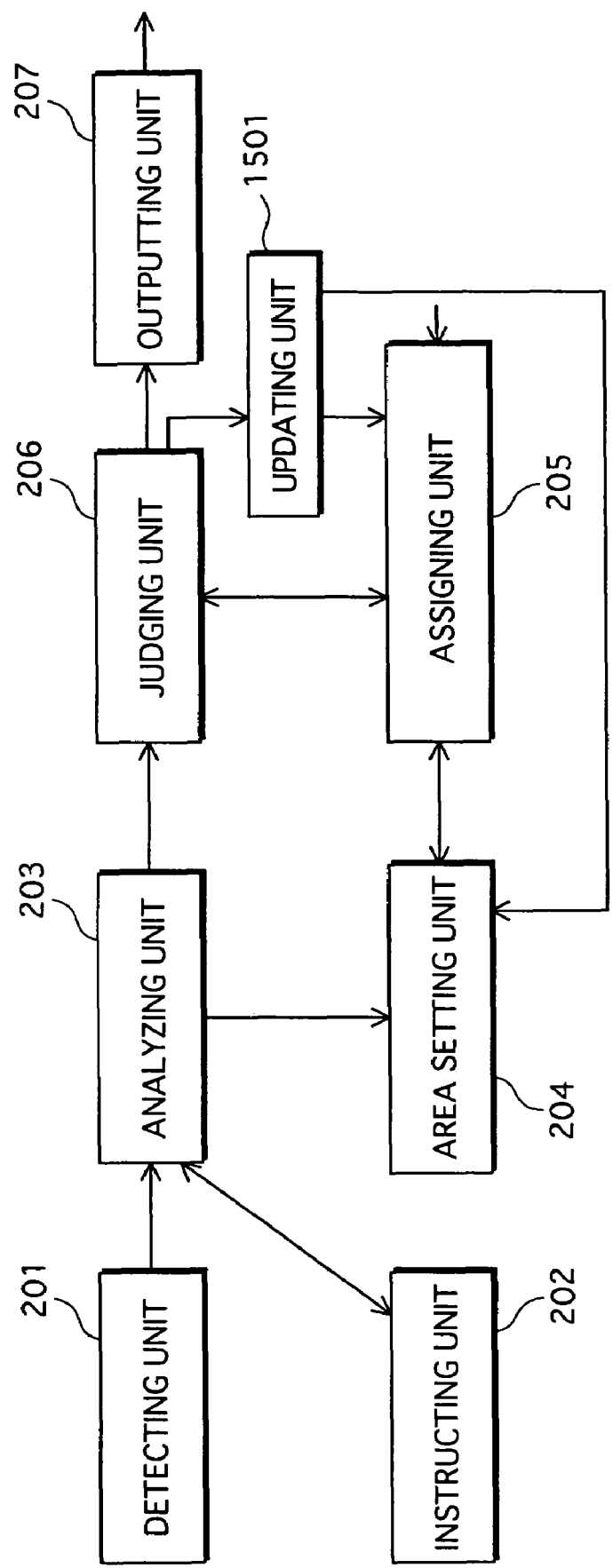
FIG. 15 is a structural diagram of an operation instructing device according to a second embodiment of the present invention.

FIG. 15 is a structural view of an operation instructing device of a second embodiment according to the present invention.

The operation instructing device of the second embodiment further includes an updating unit 1501, in addition to the operation instructing device of the first embodiment. The following explains a structure specific to the second embodiment and different form the first embodiment.

When the motion value notified by the analyzing unit 203 does not fall within any of the sub areas, the judging unit 206 calculates a difference between the notified motion value and one of lower and upper thresholds of a sub area that is the closest to the notified motion value. If the difference is smaller than a predetermined average value, "3" for example, the judging unit 206 notifies the updating unit 1501 of the calculated difference, the direction of the detected motion value, and whether the threshold that has been used in the calculation is the lower threshold or the upper threshold.

The updating unit 1501 shifts the sub area of the movement detection area set by the area setting unit 204 toward the direction where the notified motion value exist.

Specifically, when the upper threshold in the right direction is "61" (see FIG. 6) and the motion value in the same direction notified to the judging unit 206 is "63", the updating unit 1501 is notified of a difference "2", a direction "right", and a threshold "upper".

The updating unit 1501 updates the lower threshold and the upper threshold on a positive side on the X axis (right); the lower threshold is updated to "21" from "19" and the upper threshold is updated to "63" from "61". By doing so, the movement detection area is updated. Further, the updating unit 1501 instructs the assigning unit 205 to update the operation instruction table.

The assigning unit 205 assigns each of the operation instructions to each of new sub areas in an operation instruction table that has to be updated, and updates the operation instruction table.

As has been explained in the above, according to the present embodiment, it is possible to updates the movement detection area according to a range of the user movements, in a case in which the user movements change their range in course of time even after the movement detection area has been set based on individuality of the user movements previously.

Moreover, it is also possible that the setting mode starts automatically, when the judging unit 206 fails to judge the user movements successively, so as to recalculate the thresholds to each direction by having the user perform the strong and weak user movements to each direction.

Third Embodiment

In the above first and second embodiments, the movement detection area is set in a virtual space based on normalized numbers of acceleration values detected by the three-dimensional acceleration sensor 104. In a third embodiment, however, the movement detection area is set using moving distances as motion values.

The structure of the present embodiment is substantially the same as the first embodiment illustrated in FIG. 2. The following explains characteristics of the third embodiment, using the structure of the first embodiment.

The analyzing unit 203 calculates a moving distance of the housing 103 by integrating an inputted acceleration value twice by a time t.

In the setting mode, the area setting unit 204 is notified of more than one moving distance for each direction from the analyzing unit 203. The area setting unit 204 sets a range within maximum distances of all directions as the movement detection area.

The assigning unit 205 assigns, upon receiving a notification about operation instructions for each function, each operation instruction to one of the sub areas of the movement detection area according to a number of operation and directions.

Figure 16:
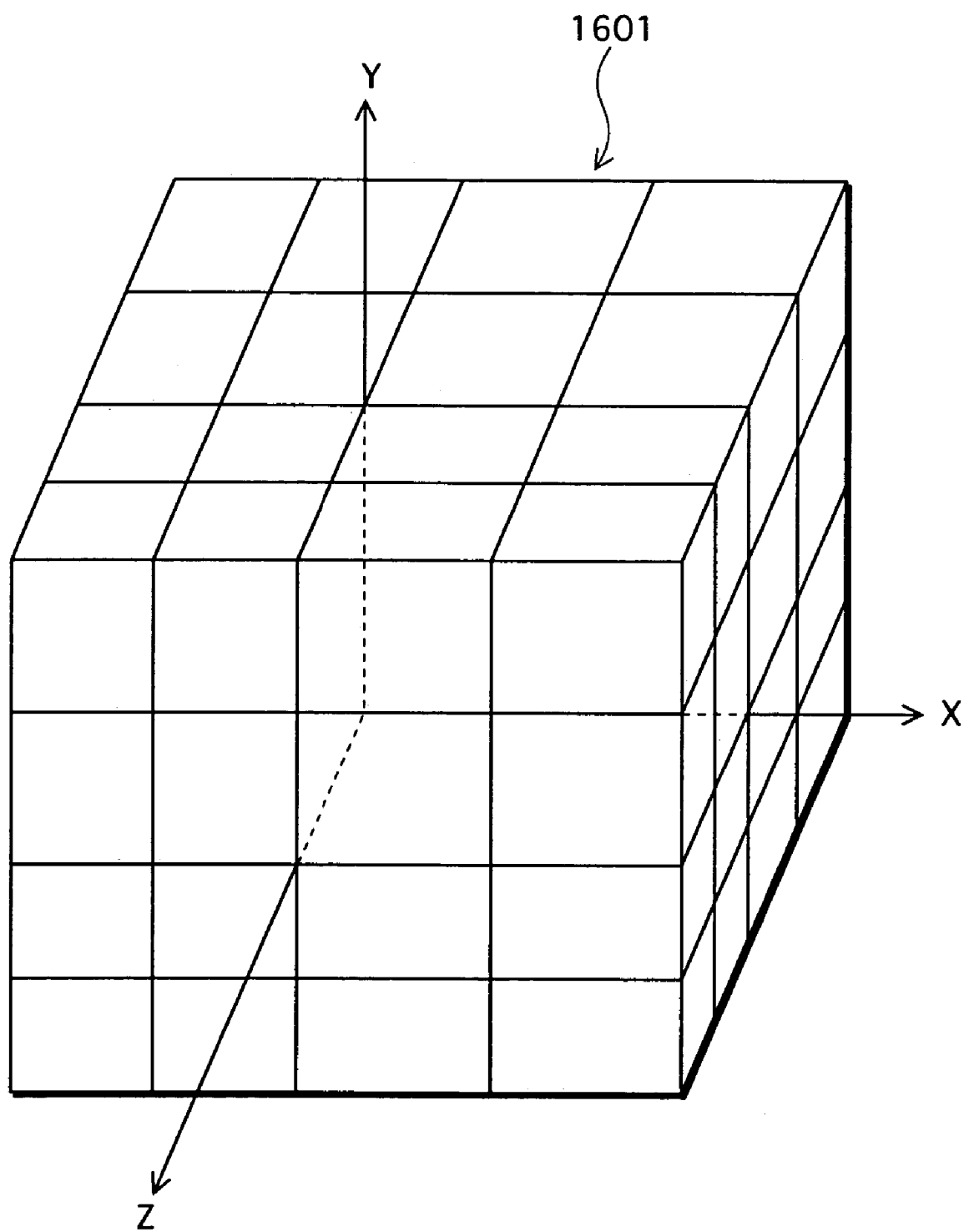
FIG. 16 is a diagram explaining assignment of operation instructions to a movement detection area of a third embodiment of the present invention.

FIG. 16 illustrates a movement detection area 1601, which is divided into 64 sub areas by splitting each direction of a three-dimensional space in two. The division inside the area is not shown in the drawing. The movement detection area 1601 is a three-dimensional space with a position of the three-dimensional acceleration sensor 104 being an origin of X, Y, and Z axes.

The user may instruct various operations by adjusting the moving direction and distance of the housing 103.

The judging unit 206 judges which sub area in the movement detection area 1601 to be selected from moving distances in each direction notified from the analyzing unit 203, reads the operation instruction assigned to the sub area, and notifies the read operation instruction to the outputting unit 207.

As shown in FIG. 16, distances of the movement detection area 1601 are different in directions, reflecting differences of strength of the user for each direction.

Fourth Embodiment

In the above first through third embodiments, the detecting unit 201 uses an acceleration sensor. In a fourth embodiment, however, the detecting unit includes a gyroscope for detecting angular accelerations in place of the acceleration sensor.

Operation instructions as an example in this embodiment is for rotating contents displayed in a screen according to an angle calculated from an angular acceleration detected by the gyroscope.

Figure 17B:
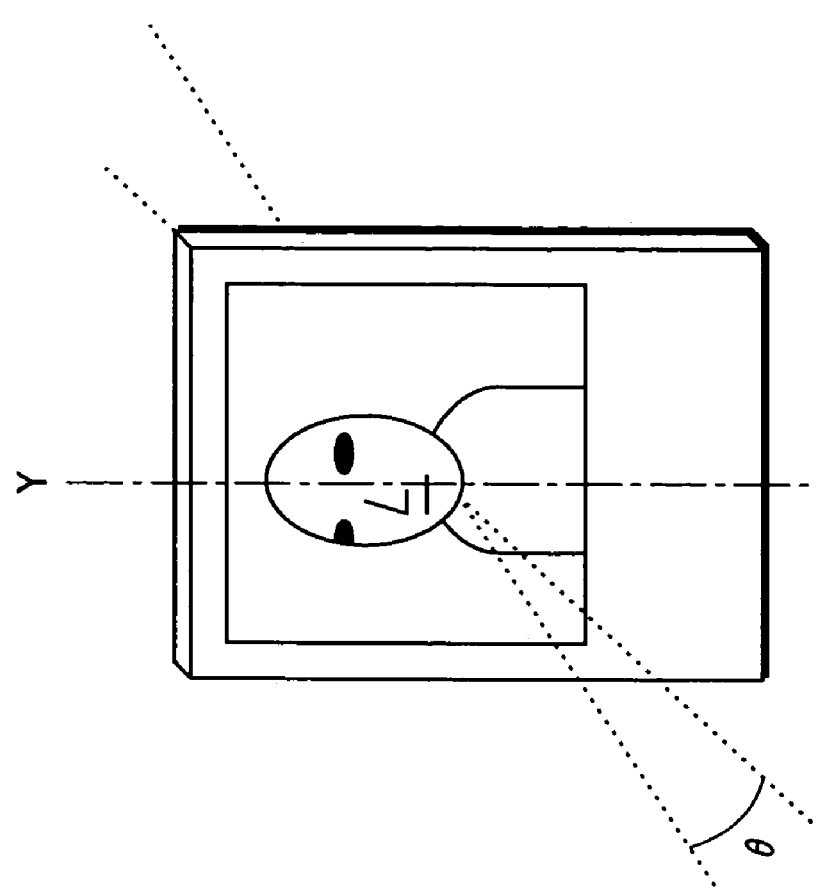
FIGS. 17a and 17b are diagrams explaining operation instructions of a fourth embodiment of the present invention.
Figure 17A:
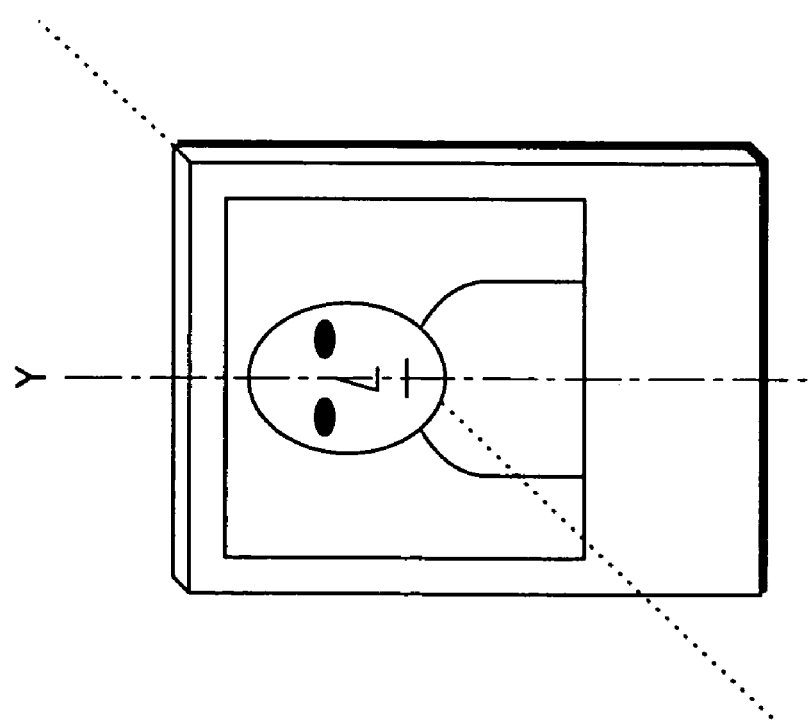

For example, as shown in FIG. 17A, a portrait of a person is illustrated facing straight to a viewing direction of the displaying unit 102. When the user rotates the housing 103 at an angle θ in clockwise direction with Y axis as a rotation axis, the judging unit 206 reads an operation instruction "rotates the direction of content at θ". The outputting unit 207 outputs the read operation instruction to the portable information apparatus 101.

By the above operation, the portrait displayed in the displaying unit 102 faces sideways at the angle θ in FIG. 17B.

In the present embodiment, the angle calculated by the operation analyzing unit 203 and the rotation angle in the operation instruction are the same. However, like the first embodiment it is also possible to set angles as the movement detection area from average values and such obtained by having the user perform rotating movements for several times, and then to make correspondence between the set angles and rotation angles indicated by the operation instructions.

It is, also possible that an amount of angular variation is detected using an inclination sensor and the like.

Although the structures of the operation instructing device in the above embodiments are shown in FIGS. 2 and 15, the present invention may be realized as a program to have a computer execute each function shown in the drawings.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An operation instructing device included in a portable apparatus, said device comprising:
   an area setting unit operable to set a movement detection area for a specific user, based on motion values resulting from movements unique to the user;
   an instructing unit operable, when in a setting mode, to instruct a plurality of movements, the setting mode being a state in which the area setting unit is activated;
   a detecting unit operable to detect, for each of the instructed movements, motion values of the portable apparatus that result from user movements in accordance with the instructed movements; and an assigning unit operable to assign each of a plurality of operation instructions relating to a function of the portable apparatus to different sub areas of the movement detection area.

2. An operation instructing device according to claim 1, wherein the detecting unit is a gyroscope, and the assigning unit assigns each of the operation instructions to a different sub area, the operation instructions being for rotating a viewing direction of an image displayed on a screen of the portable apparatus, based on angular accelerations detected by the gyroscope.

3. An operation instructing device according to claim 1, wherein the instructed movements are repeated a number of times, and include shaking movements of a strong strength and a weak strength in directions that are positive and negative along each of three axes of a three-dimensional space, the detecting unit is a three-dimensional acceleration sensor, and the area setting unit includes:

an average value calculating subunit operable to store, for each time that each shaking movement is repeated, a maximum value of acceleration values detected by the sensor within a predetermined time period, and to calculate an average value for each shaking movement in each direction from the stored maximum values;

a threshold calculating subunit operable to calculate, using an equation, lower and upper thresholds for each direction, based on the calculated average values for the weak and strong shaking movements in the direction; and a setting subunit operable to set the range between the lower and upper thresholds in each direction as one of the sub areas of the movement detection area.

4. An operation instructing device according to claim 3, further comprising:

a judging unit operable to judge, when in a mode other than the setting mode, within which sub area each motion value detected by the detecting unit falls; and an instruction outputting unit operable to output, to the portable apparatus, the operation instruction assigned to the sub area within which the detected motion value is judged to fall.

5. An operation instructing device according to claim 4, further comprising:

an updating unit operable, when the motion value deviates from any of the sub areas, and the deviation is less than a predetermined value, to shift lower and upper thresholds of the sub area by the amount of the deviation.

6. An operation instructing device according to claim 3, wherein the threshold calculating unit uses equations:

$$LowTh = AvMxAcc(dir, w) - \frac{AvMxAcc(dir, s) - AvMxAcc(dir, w)}{2}$$

and $$UpTh = \frac{AvMxAcc(dir, s) + AvMxAcc(dir, w)}{2},$$

where "LowTh" indicates the lower threshold, "Upth" indicates the upper threshold, "AvMxAcc" indicates the average value of maximum acceleration values, "dir" indicates a direction in which the user performed the movement, "w" indicates a weak movement, and "s" indicates a strong movement.

7. An operation instructing device according to claim 1, wherein the assigning unit selects one of one-dimensional, two-dimensional, and three-dimensional movement detection areas, according to a total number and directions of the operation instructions, and assigns each of the operation instructions to a sub area in a matching direction with a direction that the assigned operation instruction indicates.

8. An operation instructing device according to claim 1, wherein the detecting unit is a three-dimensional acceleration sensor, and the area setting unit sets the movement detection area based on distances obtained by twice integrating acceleration values detected by the sensor.

9. A computer operation instructing program that executes an operation instructing method in which a sensor included in a portable apparatus detects motion values of the portable apparatus that result from user movements, the program comprising the steps of:

instructing a plurality of movements in a setting mode;

detecting, by the sensor, motion values of the portable apparatus that result from the user movements;

setting a movement detection area, based on motion values for each of the instructed movements;

assigning each of a plurality of operation instructions relating to a function of the portable apparatus to different sub areas of the movement detection area;

judging, when in a mode other than the setting mode, within which sub area the detected motion value falls; and outputting, to the portable apparatus, the operation instruction assigned to the sub area within which the detected motion value is judged to fall.

10. An operation instructing method in which a sensor included in a portable apparatus detects motion values of the portable apparatus that result from user movements, the method comprising the steps of:

instructing a plurality of movements in a setting mode;

detecting, by the sensor, motion values of the portable apparatus that result from the user movements;

setting a movement detection area, based on motion values for each of the instructed movements;

assigning each of a plurality of operation instructions relating to a function of the portable apparatus to different sub areas of the movement detection area;

judging, when in a mode other than the setting mode, within which sub area the detected motion value falls; and outputting, to the portable apparatus, the operation instruction assigned to the sub area within which the detected motion value is judged to fall.

* * * * *